US010357083B2

(12) United States Patent
Babin et al.

(10) Patent No.: US 10,357,083 B2
(45) Date of Patent: Jul. 23, 2019

(54) BUCKLE ASSEMBLIES AND ASSOCIATED SYSTEMS AND METHODS FOR USE WITH CHILD SEATS AND OTHER RESTRAINT SYSTEMS

(71) Applicant: Shield Restraint Systems, Inc., Elkhart, IN (US)

(72) Inventors: Brian George Babin, Bristol, IN (US); Donald Richard Ireland, Middlebury, IN (US); Phillip Dale Morgan, Noblesville, IN (US)

(73) Assignee: Shield Restraint Systems, Inc., Elkhart, IN (US)

( * ) Notice: Subject to any disclaimer, the term of this patent is extended or adjusted under 35 U.S.C. 154(b) by 71 days.

(21) Appl. No.: 15/706,489

(22) Filed: Sep. 15, 2017

(65) Prior Publication Data

US 2018/0078001 A1 Mar. 22, 2018

Related U.S. Application Data

(60) Provisional application No. 62/395,515, filed on Sep. 16, 2016.

(51) Int. Cl.
*A44B 11/25* (2006.01)
*B60R 22/10* (2006.01)

(52) U.S. Cl.
CPC ....... *A44B 11/2511* (2013.01); *A44B 11/2561* (2013.01); *A44B 11/2569* (2013.01);
(Continued)

(58) Field of Classification Search
CPC ............. A44B 11/2511; A44B 11/2569; A44B 11/2561; A44B 11/2592; A44B 11/2573;
(Continued)

(56) References Cited

U.S. PATENT DOCUMENTS 3,799,610 A 3/1974 Hollins
4,604,773 A 8/1986 Weber et al.
(Continued)

FOREIGN PATENT DOCUMENTS

DE 4420457 12/1995
EP 1472949 11/2004
(Continued)

OTHER PUBLICATIONS

International Search Report and Written Opinion dated Dec. 11, 2017; International Application No. PCT/US2017/051907; 14 pages.

Primary Examiner — Robert Sandy
(74) Attorney, Agent, or Firm — Perkins Coie LLP

(57) ABSTRACT

Buckle assemblies and associated systems and methods for use with child seats and other restraint systems are disclosed herein. In one embodiment, a buckle assembly includes a housing having an opening shaped to receive a first tongue of a first web connector and a second tongue of a second web connector. The buckle assembly also includes a spring having a first ejector arm carrying a first magnet and a second ejector arm carrying a second magnet. A switch assembly is positioned within the housing, and insertion of the tongues into the housing to latch the buckle assembly moves the magnets toward the switch assembly to activate switches in the switch assembly and produce a signal confirming buckle engagement.

19 Claims, 8 Drawing Sheets

(52) U.S. Cl.
CPC ...... *A44B 11/2573* (2013.01); *A44B 11/2592* (2013.01); *B60R 22/105* (2013.01); *A44D 2203/00* (2013.01)

(58) Field of Classification Search
CPC .......... B60R 22/105; B60R 2022/4816; A44D 2203/00; Y10T 24/45613
See application file for complete search history.

(56) References Cited

U.S. PATENT DOCUMENTS

| | | | |
|---|---|---|---|
| 4,679,852 A | 7/1987 | Anthony et al. | |
| 4,699,401 A | 10/1987 | Saenz | |
| 4,715,096 A | 12/1987 | Fleming et al. | |
| 4,738,485 A | 4/1988 | Rumpf | |
| 4,785,906 A | 11/1988 | Kang | |
| 4,884,652 A | 12/1989 | Vollmer | |
| 4,886,315 A | 12/1989 | Johnson | |
| 4,989,299 A | 2/1991 | Morita | |
| 5,038,446 A | 8/1991 | Anthony et al. | |
| 5,061,012 A | 10/1991 | Parker et al. | |
| 5,142,748 A | 9/1992 | Anthony et al. | |
| 5,182,837 A | 2/1993 | Anthony et al. | |
| 5,220,713 A | 6/1993 | Lane, Jr. et al. | |
| 5,233,732 A | 8/1993 | Yamanishi | |
| 5,283,933 A | 2/1994 | Wiseman et al. | |
| 5,383,708 A | 1/1995 | Nagasaka et al. | |
| 5,429,419 A | 7/1995 | Kassai et al. | |
| 5,458,369 A | 10/1995 | Matsuki et al. | |
| 5,482,352 A | 1/1996 | Leal et al. | |
| 5,526,556 A | 6/1996 | Czank | |
| 5,624,156 A | 4/1997 | Leal et al. | |
| 5,681,094 A | 10/1997 | Brown et al. | |
| 5,699,594 A | 12/1997 | Czank et al. | |
| 5,765,774 A | 6/1998 | Maekawa et al. | |
| D397,063 S | 8/1998 | Woellert et al. | |
| 5,788,281 A | 8/1998 | Yanagi et al. | |
| 5,813,097 A | 9/1998 | Woellert et al. | |
| 5,851,025 A | 12/1998 | Gamboa | |
| 5,873,599 A | 2/1999 | Bauer et al. | |
| 5,890,762 A | 4/1999 | Yoshida | |
| 5,898,366 A | 4/1999 | Brown et al. | |
| 5,970,587 A | 10/1999 | Knox | |
| 6,024,408 A | 2/2000 | Bello et al. | |
| 6,079,744 A | 6/2000 | Husby et al. | |
| 6,139,111 A | 10/2000 | Pywell et al. | |
| 6,182,783 B1 | 2/2001 | Bayley | |
| 6,305,713 B1 | 10/2001 | Pywell et al. | |
| 6,309,024 B1 | 10/2001 | Busch et al. | |
| 6,357,790 B1 | 3/2002 | Swann et al. | |
| 6,374,168 B1 | 4/2002 | Fujii | |
| 6,389,661 B1 | 5/2002 | Brown et al. | |
| 6,540,293 B1 | 4/2003 | Quackenbush | |
| 6,547,218 B2 | 4/2003 | Landy | |
| 6,582,015 B2 | 6/2003 | Jessup et al. | |
| 6,606,770 B1 | 8/2003 | Buscart | |
| 6,647,597 B2 | 11/2003 | Reiter | |
| 6,698,070 B2 | 3/2004 | Chen | |
| 6,701,587 B1 | 3/2004 | Sato et al. | |
| 6,773,075 B2 | 8/2004 | Rouhana et al. | |
| 6,811,186 B1 | 11/2004 | Fraley et al. | |
| 6,817,629 B2 | 11/2004 | Herberg et al. | |
| 6,837,547 B2 | 1/2005 | Delventhal et al. | |
| 6,868,591 B2 | 3/2005 | Dingman et al. | |
| 6,997,474 B2 | 2/2006 | Midorikawa et al. | |
| 7,011,341 B2 | 3/2006 | Herberg et al. | |
| 7,014,005 B2 | 3/2006 | Martinez et al. | |
| 7,077,472 B2 | 7/2006 | Steffens, Jr. | |
| 7,077,475 B2 | 7/2006 | Boyle | |
| 7,131,668 B2 | 11/2006 | Go | |
| 7,152,282 B2 * | 12/2006 | Costa | A44C 5/20 24/303 |
| 7,159,948 B1 | 1/2007 | Wolf | |
| 7,178,208 B2 | 2/2007 | Bentsen et al. | |
| 7,201,399 B2 | 4/2007 | Frank et al. | |
| 7,201,444 B2 | 4/2007 | Schimmoller et al. | |
| 7,216,827 B2 | 5/2007 | Tanaka et al. | |
| 7,246,854 B2 | 7/2007 | Dingman et al. | |
| 7,278,684 B2 | 10/2007 | Boyle | |
| 7,296,825 B1 | 11/2007 | Zia et al. | |
| 7,350,767 B2 | 4/2008 | Huang | |
| 7,410,212 B2 | 8/2008 | Lawrence et al. | |
| 7,422,283 B2 | 9/2008 | Patterson et al. | |
| 7,463,161 B2 | 12/2008 | Griffin et al. | |
| 7,466,221 B1 | 12/2008 | Lehr | |
| 7,520,036 B1 | 4/2009 | Baldwin et al. | |
| 7,625,048 B2 | 12/2009 | Rouhana et al. | |
| 7,673,906 B2 | 3/2010 | Bell | |
| 7,698,791 B2 | 4/2010 | Pezza | |
| 7,770,969 B2 | 8/2010 | Boyle et al. | |
| 7,775,557 B2 | 8/2010 | Bostrom et al. | |
| 7,819,472 B2 | 10/2010 | Hutchinson et al. | |
| 7,976,092 B2 | 7/2011 | Meredith et al. | |
| 7,980,630 B2 | 7/2011 | Pos | |
| 8,002,348 B2 | 8/2011 | Jessup et al. | |
| 8,007,043 B1 | 8/2011 | Vuong | |
| 8,016,318 B2 | 9/2011 | Nezaki | |
| 8,016,676 B2 | 9/2011 | Carter | |
| 8,038,213 B2 | 10/2011 | Owens | |
| 8,066,303 B2 | 11/2011 | Nezaki | |
| 8,113,584 B2 | 2/2012 | Boyle et al. | |
| 8,251,445 B2 | 8/2012 | Pos | |
| 8,272,689 B2 | 9/2012 | Biaud et al. | |
| 9,814,282 B2 | 11/2017 | Merrick | |
| 2004/0251367 A1 | 12/2004 | Suzuki et al. | |
| 2006/0038436 A1 | 2/2006 | Siewertsen et al. | |
| 2006/0049677 A1 | 3/2006 | Lawrence et al. | |
| 2007/0001495 A1 | 1/2007 | Boyle et al. | |
| 2007/0075574 A1 | 4/2007 | James | |
| 2007/0210639 A1 | 9/2007 | Berger et al. | |
| 2007/0228802 A1 | 10/2007 | Nakhla | |
| 2007/0261217 A1 | 11/2007 | Buscart | |
| 2008/0093833 A1 | 4/2008 | Odate | |
| 2008/0173523 A1 | 7/2008 | Bahr et al. | |
| 2008/0141505 A1 | 10/2008 | Borst | |
| 2008/0246316 A1 | 10/2008 | Carine et al. | |
| 2009/0069983 A1 | 3/2009 | Humbert et al. | |
| 2009/0183348 A1 | 7/2009 | Walton et al. | |
| 2009/0278390 A1 | 11/2009 | Carter | |
| 2010/0033001 A1 | 2/2010 | Boyer | |
| 2010/0052385 A1 | 3/2010 | Martini | |
| 2010/0201170 A1 | 8/2010 | Brandl et al. | |
| 2010/0213753 A1 | 8/2010 | Humbert | |
| 2010/0253121 A1 | 10/2010 | Buckingham et al. | |
| 2011/0006569 A1 | 1/2011 | Davies | |
| 2011/0291451 A1 | 12/2011 | Westman | |
| 2012/0080917 A1 | 4/2012 | Miller et al. | |
| 2012/0193955 A1 | 8/2012 | Seike | |
| 2012/0310483 A1 | 12/2012 | Lanter | |
| 2013/0038101 A1 | 2/2013 | Friedman | |
| 2015/0298651 A1 | 10/2015 | Klaasen | |
| 2016/0121848 A1 | 5/2016 | Seibert | |
| 2016/0137153 A1 | 5/2016 | Kim | |

FOREIGN PATENT DOCUMENTS

| | | |
|---|---|---|
| EP | 1547484 | 6/2005 |
| EP | 1631166 | 3/2006 |
| JP | 2005178513 | 7/2005 |
| JP | 4604482 | 1/2011 |
| WO | WO-2006044809 | 4/2006 |
| WO | WO-2012037398 | 3/2012 |
| WO | WO-2013016310 | 1/2013 |

* cited by examiner

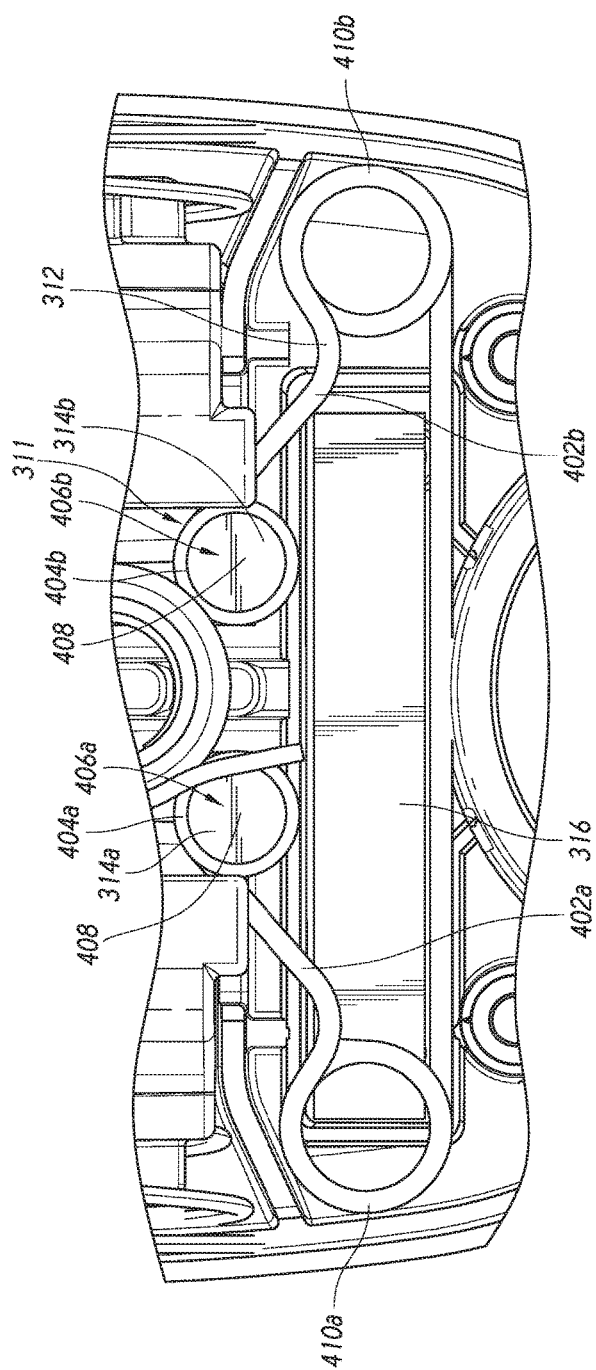
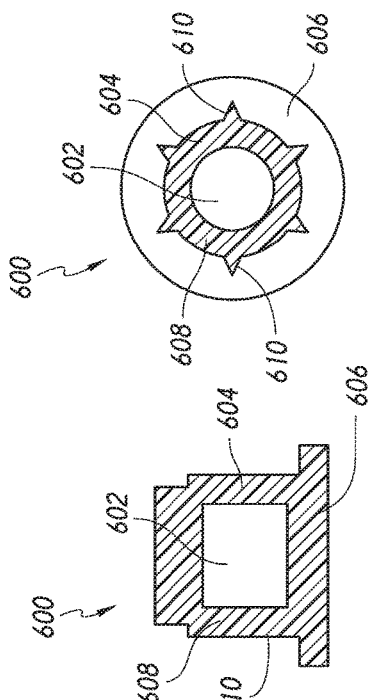
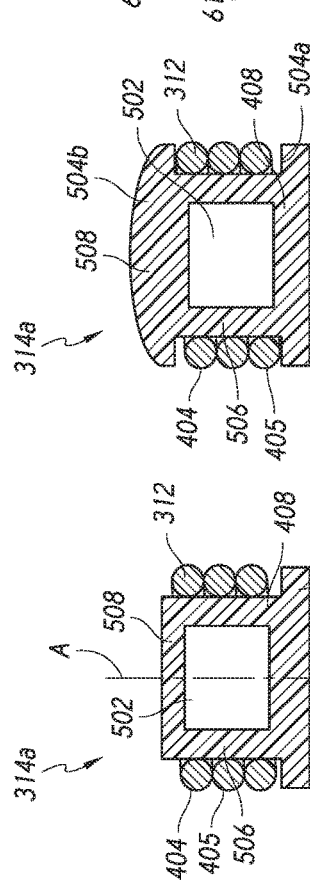
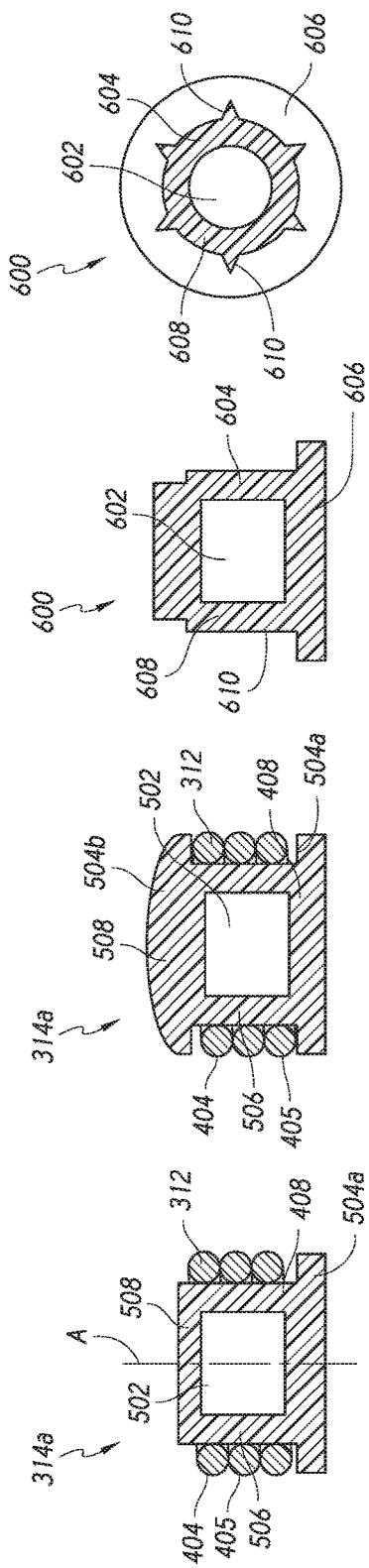

US 10,357,083 B2

BUCKLE ASSEMBLIES AND ASSOCIATED SYSTEMS AND METHODS FOR USE WITH CHILD SEATS AND OTHER RESTRAINT SYSTEMS

CROSS-REFERENCE TO RELATED APPLICATION

The present application claims the benefit of and priority to U.S. Provisional Application No. 62/395,515, filed Sep. 16, 2016, and titled "Buckle Assemblies and Associated Systems and Methods for Use with Child Seats and Other Restraint Systems," which is incorporated herein by reference in its entirety.

TECHNICAL FIELD

The following disclosure relates generally to personal restraint systems for use in vehicles and, more particularly, to buckle assemblies for use with child seats and other personal restraint systems.

BACKGROUND

Many types of personal restraint systems are used in automobiles and other vehicles. Such systems include, for example, seat belts for use by adults and children of sufficient size, and child seats with associated restraints for use by toddlers and small children. The seat belts and restraints in these systems generally include buckles that couple two or more lengths of webbing together to restrain an occupant in their seat. In some instances, the buckle includes a switch to monitor the status of the buckle (e.g., latched or unlatched). Such switches typically include moving parts that generate a signal by, e.g., closing or opening an electrical circuit. A variety of issues can impair the operation of the moving parts. For example, contamination (e.g., dirt, grime, water, etc.) can hinder or prevent proper movement of the moving parts, or can otherwise prevent proper functioning of the switch.

BRIEF DESCRIPTION OF THE DRAWINGS

FIG. 4 is an enlarged top view of a buckle ejector and indicating mechanism configured in accordance with an embodiment of the present technology.

FIG. 5A is a cross-sectional side view of a magnet assembly configured in accordance with an embodiment of the present technology prior to heat staking, and FIG. 5B is a cross-sectional side view of the magnet assembly after heat staking.

FIGS. 6A and 6B are cross-sectional side and top views, respectively, of a magnet assembly configured in accordance with an embodiment of the present technology prior to heat staking.

DETAILED DESCRIPTION

The following disclosure describes various embodiments of buckle assemblies having engagement indicating systems and associated methods of manufacture and use. In some embodiments, a buckle assembly includes a housing having an opening shaped to receive a first tongue of a first web connector and a second tongue of a second web connector. The buckle assembly also includes a spring positioned within the housing and having a first ejector arm and a second ejector arm. A first magnet can be operably coupled to the first ejector arm and a second magnet can be operably coupled to the second ejector arm. A switch assembly is positioned within the housing, and insertion of the tongues into the housing moves the ejector arms and the magnets to activate the switch assembly when the tongues have been fully engaged by the buckle assembly. In other embodiments, the devices, systems and associated methods described herein can have different configurations, components, and/or procedures. Still other embodiments may eliminate particular components and/or procedures. A person of ordinary skill in the relevant art, therefore, will understand that the present technology, which includes associated devices, systems, and procedures, may include other embodiments with additional elements or steps, and/or may include other embodiments without several of the features or steps shown and described below with reference to FIGS. 1-9.

Certain details are set forth in the following description and FIGS. 1-9 to provide a thorough understanding of various embodiments of the disclosure. To avoid unnecessarily obscuring the description of the various embodiments of the disclosure, other details describing well-known structures and systems often associated with vehicle occupant restraint systems, buckle assemblies, indicating switches, and the components or devices associated with the manufacture of vehicle occupant restraint systems, buckle assemblies and indicating switches are not set forth below. Moreover, many of the details and features shown in the Figures are merely illustrative of particular embodiments of the disclosure. Accordingly, other embodiments can have other details and features without departing from the spirit and scope of the present disclosure. In addition, the various elements and features illustrated in the Figures may not be drawn to scale. Furthermore, various embodiments of the disclosure can include structures other than those illustrated in the Figures and are expressly not limited to the structures shown in the Figures.

Figure 1:
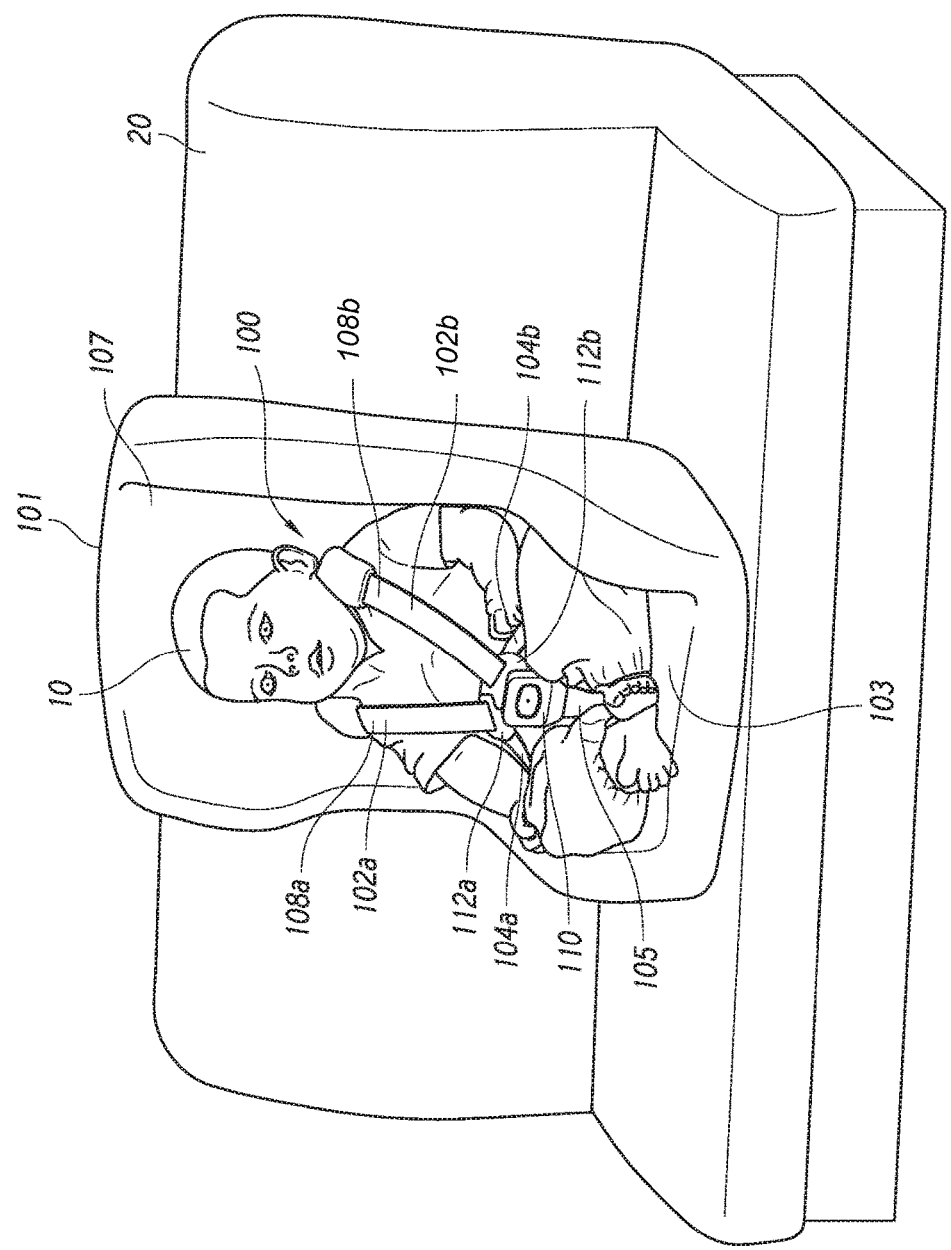
FIG. 1 is an isometric view illustrating a restraint system having a buckle assembly configured in accordance with an embodiment of the present technology.

FIG. 1 is an isometric view illustrating a restraint system 100 having a buckle assembly 110 configured in accordance with an embodiment of the present technology. In the illustrated embodiment, the restraint system 100 holds a vehicle occupant (e.g., a child or infant 10) in a child seat 101. The child seat 101 includes a base portion 103 and a back portion 107. The child seat 101 can be secured to a vehicle seat 20 using various systems known in the art. Such systems can include, for example, belts or webs (not shown) having proximal ends attached to the child seat 101 and distal ends attached to anchors (also not shown) in the bight of the vehicle seat 20 with suitable couplings. In other embodiments, the child seat 101 can be secured to the vehicle seat 20, and/or other vehicle structures, using other suitable methods known in the art. Moreover, in further embodiments the child seat 101 or variations thereof can be reversed such that the child seat 101 faces rearward toward the vehicle seat 20.

In the illustrated embodiment, the restraint system 100 includes a first web 102a and a second web 102b extending from the back portion 107 of the child seat 101. The webs 102 can include various types of woven fabric materials and/or other suitable belt or strap materials known in the art that provide sufficient strength, flexibility, durability and/or other characteristics. In this embodiment, each of the webs 102 slidably pass through an aperture in a corresponding web connector 112 (identified individually as a first web connector 112a and a second web connector 112b). Passing the webs 102 through the web connectors 112 divides each of the webs 102 into a corresponding shoulder web portion 108 (identified individually as a first shoulder web portion 108a and a second shoulder web portion 108b), and a corresponding lap web portion 104 (identified individually as a first lap web portion 104a and a second lap web portion 104b). The lap web portions 104 extend away from each other toward opposite sides of the bight region of the child seat 101 between the back portion 107 and the seat portion 103. The end portions of the webs 102 can be secured or otherwise affixed to the child seat 101 and/or other adjacent structures using various methods known in the art.

The buckle assembly 110 is attached to a distal end of a crotch web 105 that extends from the base portion 103 of the child seat 101. The proximal end of the crotch web 105 can be secured to the child seat 101 and/or other adjacent structures using various methods known in the art. Although FIG. 1 illustrates one possible use of the buckle assembly 110 (e.g., use with a "five point" harness), those of ordinary skill in the art will appreciate that the buckle assembly 110, the web connectors 112, and/or the other components of the restraint system 100 described herein can be used in a number of other restraint system arrangements and configurations.

Figure 2:
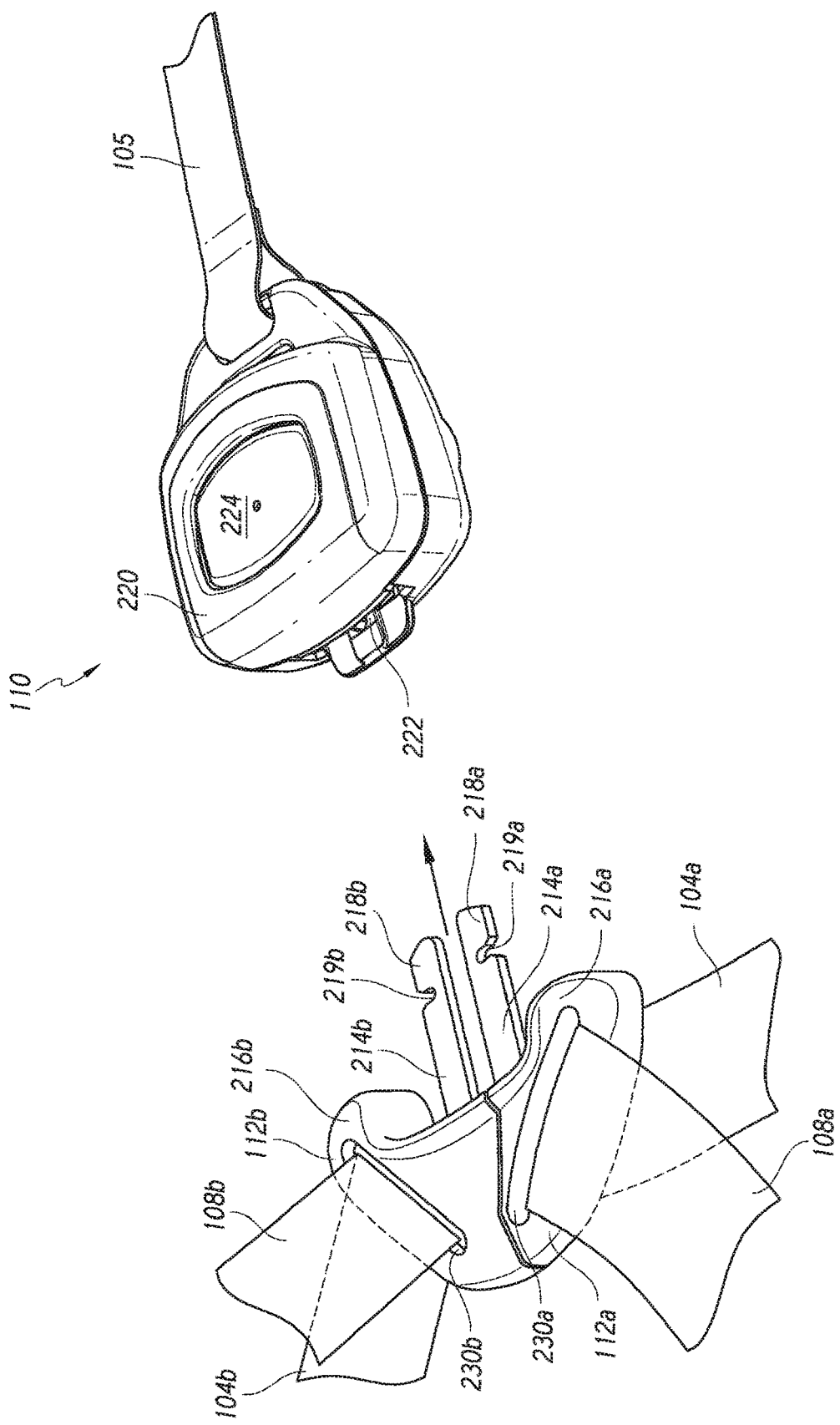
FIG. 2 is an enlarged isometric view of the buckle assembly of FIG. 1 in a disengaged state.

FIG. 2 is an enlarged isometric view of the buckle assembly 110 of FIG. 1 prior to engagement with the web connectors 112. In the illustrated embodiment, the web connectors 112 include tongues 214 (identified individually as a first tongue 214a and a second tongue 214b) and a corresponding web receiving portion 216 (identified individually as a first web receiving portion 216a and a second web receiving portion 216b). The web receiving portions 216a and 216b can include corresponding apertures 230a and 230b, respectively, through which the corresponding shoulder web 108 passes. The tongues 214 can include corresponding engagement features 218a and 218b, and recesses 219a and 219b. The engagement features 218 can be configured to releasably engage corresponding locking features in the buckle assembly 110, as described in more detail below. Various types of suitable engagement features, recesses, and corresponding locking features are known in the art and can be used with the connector tongue embodiments described herein. In the illustrated embodiment, the connector tongues 214 are configured to be inserted separately into the buckle assembly 110. In other embodiments, however, the tongues 214 can be configured to be mated or interlocked with one another first so that the tongues 214 can be simultaneously inserted into the buckle assembly 110.

The buckle assembly 110 can include a body or a housing 220 having a tongue opening 222 shaped to receive the connector tongues 214 for engagement with the buckle assembly 110 in an engaged or latched configuration. The buckle assembly 110 can also include a release actuator in the form of a button 224, which can be depressed to release or disengage the tongues 214 from locking features of the buckle assembly 110. Various portions of the web connectors 112 and the buckle assembly 110 can be made of plastic, metal, or other suitable non-metallic or metallic materials known in the art, or can be a combination of various materials. For example, the tongues 214 can be formed from metal or metal alloys, and the housing 220 can be made from plastic. Moreover, portions of the housing 220, the button 224 and the web connectors 112 can include a durable tactile finish that facilitates grasping and/or manipulation of these components.

Figure 3A:
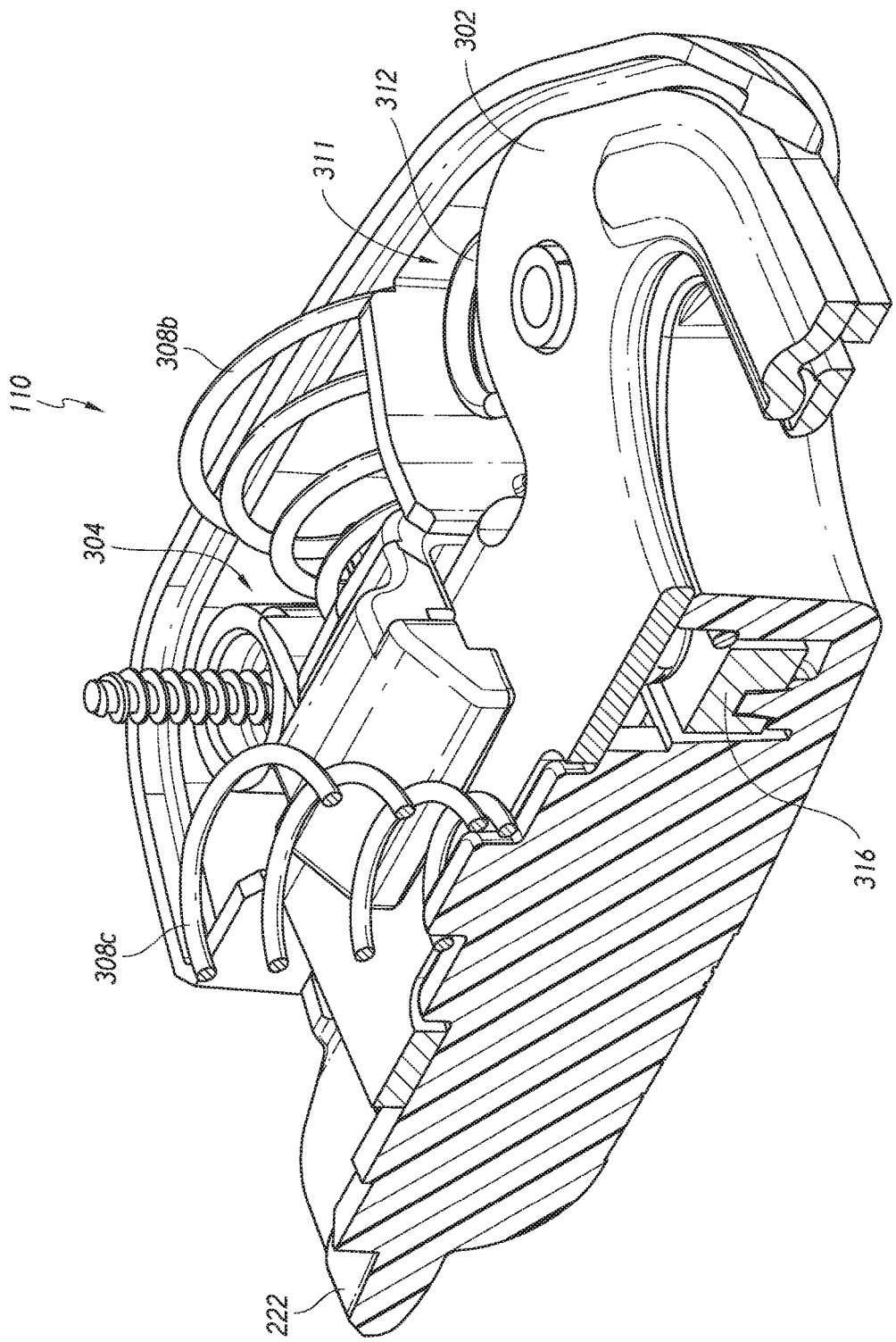
FIGS. 3A and 3B are cross-sectional isometric and isometric views, respectively, of the buckle assembly of FIGS. 1 and 2.
Figure 3B:
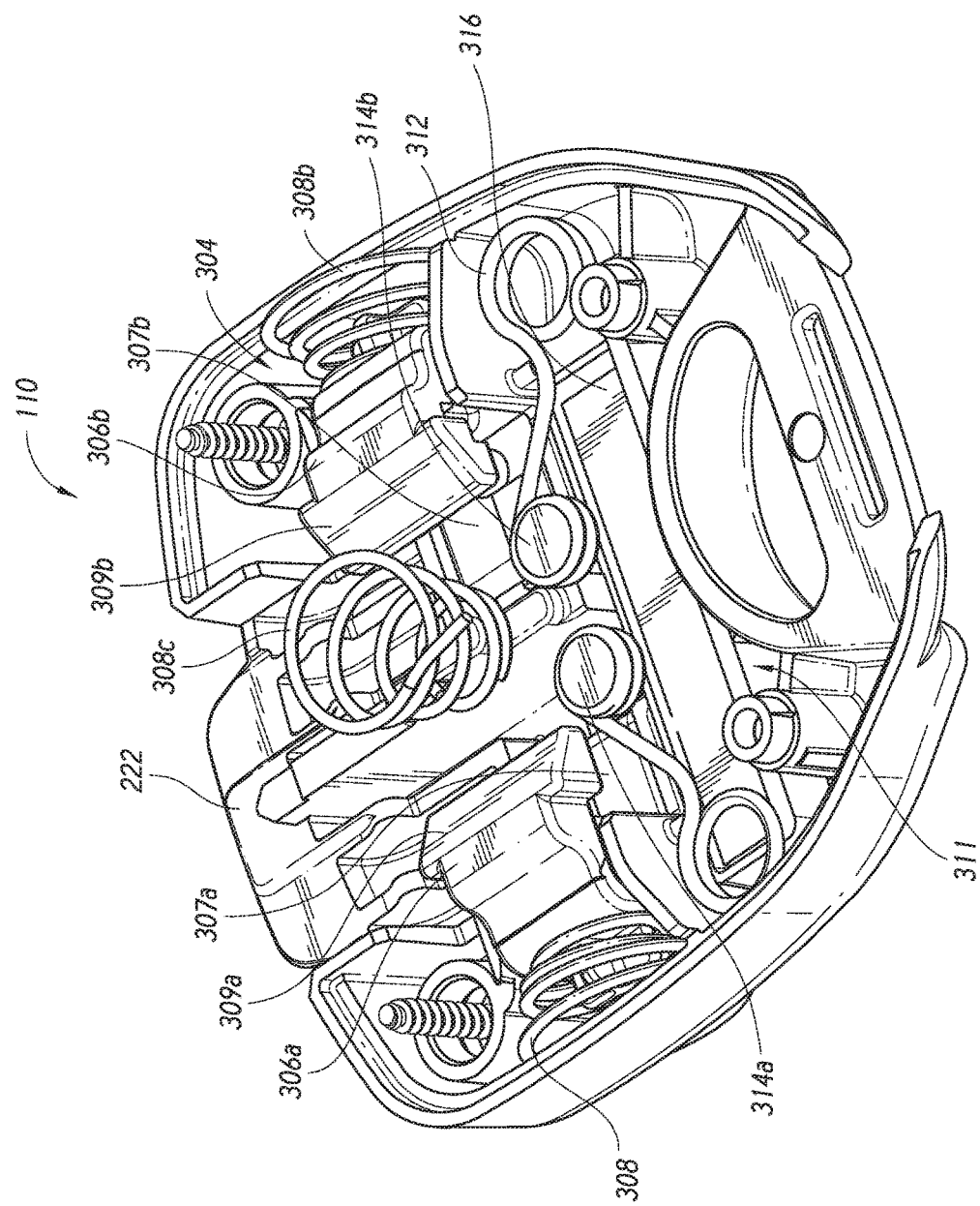

FIGS. 3A and 3B are cross-sectional isometric and isometric views, respectively, of the buckle assembly 110 configured in accordance with an embodiment of the present technology. In the illustrated embodiment, several components have been omitted to better illustrate internal components of the buckle assembly 110. For example, in FIG. 3A, an upper portion of the housing 220 has been removed to expose several internal components of the buckle assembly 110, including a frame 302 that extends into an interior portion 304 of the buckle assembly 110. In FIG. 3B, the frame 302 is removed to better illustrate additional internal components of the buckle assembly 110. FIG. 3C is an end view of the frame 302 and a pair of opposing latch members 306 (identified individually as a first latch member 306a and a second latch member 306b) configured in accordance with an embodiment of the present technology; and FIG. 3D is a top view of the frame 302.

Figure 3D:
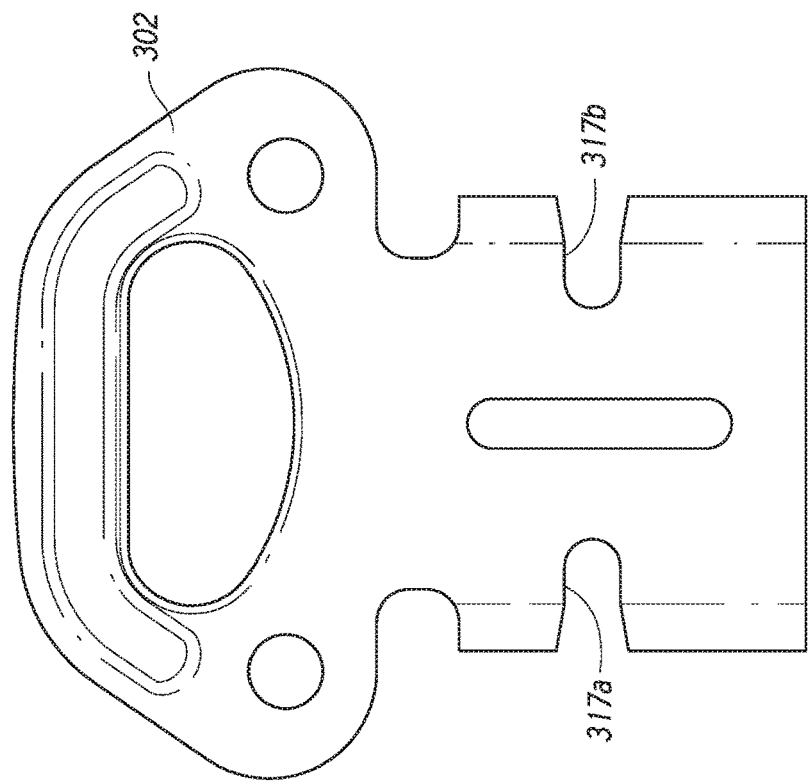
FIG. 3D is a top view of the frame.
Figure 3C:
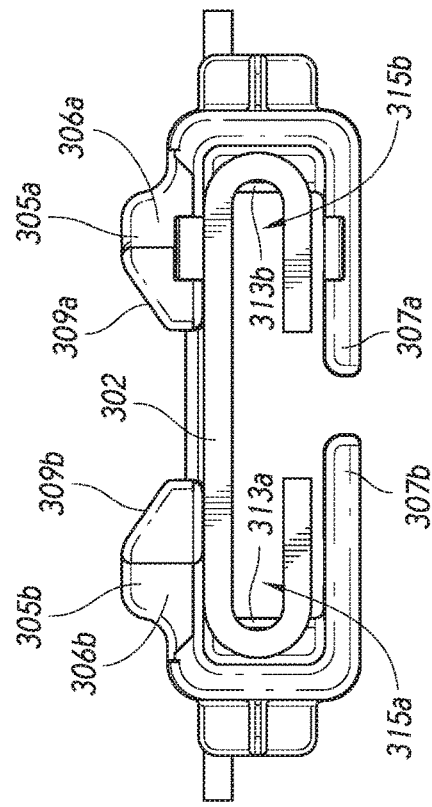
FIG. 3C is an end view of a frame and a pair of opposing latch members configured in accordance with an embodiment of the present technology.

Referring to FIGS. 3A to 3D together, the latch members 306 are slidably biased inwardly against opposite sides of the frame 302. In particular, the latch members 306a and 306b are U-shaped and include corresponding upper portions 305a and 305b, and lower portions 307a and 307b (FIG. 3C). The upper portions 305a and 305b extend above the frame 302 and include corresponding release features 309a and 309b. As described in more detail below, the release features 309 interact with the release button 224 to release the web connectors 112 (FIG. 2). The lower portions 307 extend inwardly below the frame 302, such that edge portions of the frame 302 are "sandwiched" between the upper portions 305 and the lower portions 307. The frame 302 includes a C-shaped cross-section defining a first receiving slot 315a and a second receiving slot 315b (FIG. 3C). The receiving slots 315a and 315b are shaped to receive the tongues 214a and 214b, respectively (FIG. 2). The latch features 306a and 306b include corresponding locking features 313a and 313b, respectively (FIG. 3C) that are biased into the receiving slots 315 via openings 317a and 317b in the frame 302 (FIG. 3D). As discussed in more detail below, the locking features 313 can releasably engage the tongues 214 to retain them in the buckle. Biasing members 308 (FIGS. 3A and 3B, identified individually as a first biasing member 308a and a second biasing member 308b) are positioned to bias the latch members 306 inwardly toward one another. A third biasing member 308c is positioned between the frame 302 and the release button 224 to bias the release button 224 (FIG. 2) outwardly away from the frame 302.

The buckle assembly 110 further includes a dual-purpose buckle ejector and indicating mechanism 311 ("mechanism"). The mechanism 311 includes a biasing member or spring 312 that carries a pair of magnet assemblies or magnets 314 (identified individually as a first magnet 314a and a second magnet 314b) that are attached to distal end portions of the spring 312. The mechanism 311 also includes a switch assembly 316. As described in more detail below, the spring 312 is positioned and shaped to selectively position the magnets 314 adjacent or proximate the switch assembly 316 when the tongues 214 have been properly engaged with the buckle assembly 110, and thereby provide an indication of a status of the buckle assembly 110 (e.g., latched). As also described below, the spring 312 is operable to eject the tongues 214 when the actuator 224 is depressed.

FIG. 4 is an enlarged top view of the mechanism 311. In the illustrated embodiment, the spring 312 is a metal (e.g., steel wire) spring that includes a pair of ejector arms 402 (identified individually as a first ejector arm 402a and a second ejector arm 402b) having corresponding magnet holding portions 404a and 404b. The holding portions 404 include coils 405 (identified individually as first coils 405a and second coils 405b) that form corresponding openings 406a and 406b that securely receive the magnets 314 therein. In several embodiments, the magnets 314 include plastic exteriors 408 that can be "heat staked" to securely fasten the magnets 314 in the coils 405. For example, as described in more detail below, the magnets 314 can be inserted into the openings 406 and thermoplastically staked to the spring 312 to securely fasten the magnets 314 thereto. In the illustrated embodiment, the spring 312 can be referred to as a "torsion" spring and includes biasing windings or coils 410 (identified individually as a first biasing coil 410a and a second biasing coil 410b) that, as described in more detail below, can urge the corresponding ejector arms 402 toward the opening 222 to eject the tongues 214 from the opening 222 (FIG. 2). In other embodiments, instead of a single spring 312, the mechanism 311 can include two individual springs that each carries a respective one of the magnets 314 and functions in generally the same manner as the single spring 312.

FIG. 5A is a cross-sectional side view of one of the magnets 314 (e.g., the first magnet 314a) prior to heat staking, and FIG. 5B is a cross-sectional side view of the magnet of FIG. 5A after heat staking. The first magnet 314 includes a magnetic core 502 encased by the plastic exterior 408. In some embodiments, a magnetic field produced by the magnetic core 502 can vary based on a rotational position of the magnetic core 502 with respect to a longitudinal axis A of the magnet 314. To ensure accurate indications are provided by the switch 316, the magnet 314 can be securely fastened to the spring 312 such that the magnet 314 cannot rotate about the longitudinal axis A. In the illustrated embodiment, for example, the plastic exterior 408 includes a first head portion 504a, a cylindrical body portion 506, and a stud portion 508. The magnet 314 can be positioned with the first head portion 504a adjacent to the coils 405, the cylindrical body portion 506 extending through one or more of the coils 405, and the stud portion 508 extending at least partially beyond the coils 405. The stud portion 508 can be heated and deformed (i.e., heat staked) to form a second head portion 504b, as shown in FIG. 5B. After heat staking, the coils 405 are "trapped" between the head portions 504, and the magnet 314 is thereby securely attached to the spring 312. In several embodiments, heat staking can include compression of the stud portion 508 such that the head portions 504 exert compressive forces on the one or more coils 405 positioned therebetween. The compressive forces from the head portions 504 can further secure the orientation of the magnets 314 with respect to the spring 312.

In several embodiments, heat staking of the magnet 314 can include an expansion of a diameter of the cylindrical body portion 506. In particular, heat staking of the magnet 314 can include a compression of the stud portion 508 that not only expands the stud portion 508 to form the second head portion 504b, but also compresses the cylindrical body portion 506 and thereby increases the diameter of the cylindrical body portion 506. The expanded diameter of the cylindrical body portion 506 can exert expansive forces against the one or more coils 405 and thereby assist in maintaining the position of the magnets 314 with respect to the spring 312.

FIGS. 6A and 6B are cross-sectional side and top views, respectively, of a magnet assembly 600 configured in accordance with another embodiment of the present technology prior to heat staking. Similar to the magnets 314, the magnet 600 includes a magnetic core 602 and a plastic exterior 604 having a first head portion 606 and a cylindrical body portion 608. The plastic exterior 604 also includes a plurality of protruding ribs 610 positioned in a radial pattern and extending longitudinally along the exterior of the cylindrical body portion 608. The ribs 610 can help to secure the magnet 602 within the coils 405. In particular, the ribs 610 can provide an interference fit with the coils 405, helping to reduce or prevent unwanted rotation of the magnet 600.

Although the illustrated embodiments of FIGS. 2 to 6B include magnets 314 and 600 that can be secured to the spring 312 via heat staking, in other embodiments magnets can be secured to the spring 312 via a variety of alternative fastening means and methods. For example, in several embodiments one or more magnets can be overmolded with the spring 312. In a particular example, the coils 405 can be positioned within a mold and a magnet can be positioned within the opening 406. Thermoplastic or another thermosetting polymer can then be injected into the mold and overmolded onto the magnet within the coils 405. In other embodiments, magnets can include one or more grooves or openings shaped to receive a portion of the spring 312. In one example, a magnet can include a through-hole, and the spring 312 can be shaped to extend through the through-hole and bend around at least a portion of the magnet to secure the magnet to the spring 312. In another example, the magnet can include a groove extending around its perimeter, and the groove can have a diameter shaped to match that of the coils 405.

Figure 7A:
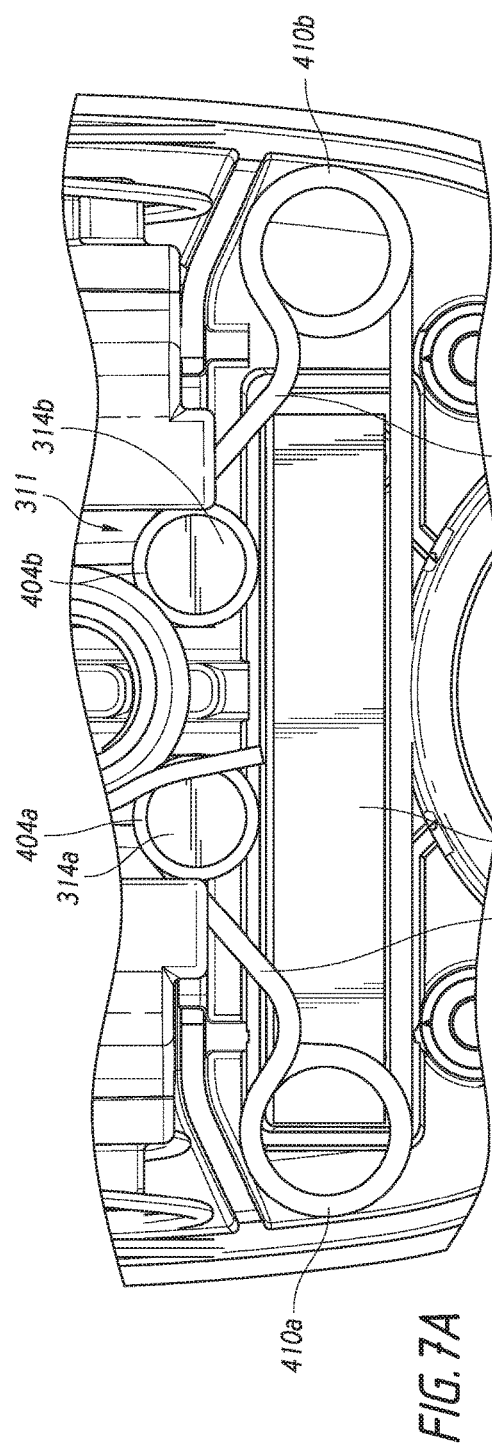
FIG. 7A is an enlarged top view of the buckle ejector and indicating mechanism of FIG. 4 in an unlatched position and configured in accordance with an embodiment of the present technology.
Figure 7B:
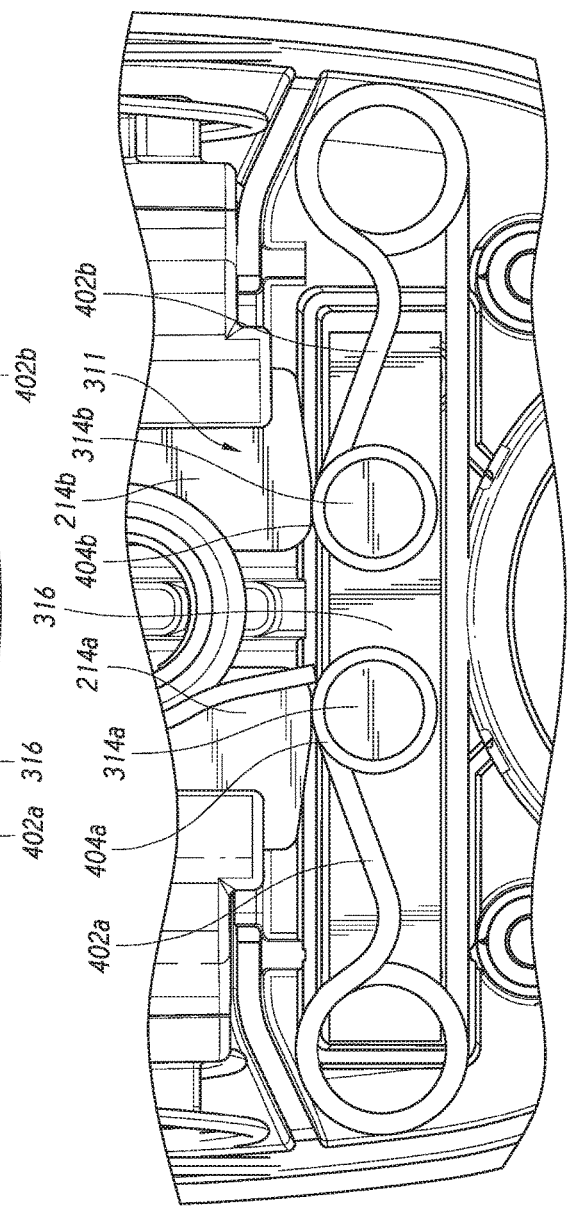
FIG. 7B is an enlarged top view of the buckle ejector and indicating mechanism in a latched position.

FIG. 7A is an enlarged top view of the buckle ejector and indicating mechanism 311 in an unlatched position, and FIG. 7B is an enlarged top view of the buckle ejector and indicating mechanism 311 in a latched position. In operation, the tongues 214 (FIG. 2) are inserted into the opening 222 (also FIG. 2) to engage the buckle assembly 110. Referring to FIGS. 3A to 3C, 7A and 7B, as the tongues 214 are advanced into the opening 222, they pass into the receiving slots 315 and contact the locking features 313, driving the associated latch members 306 outwardly, away from one another. Fully inserting the tongues 214 into the buckle assembly 110 moves the engagement features 218 past the locking features 313. As the engagement features 218 move past the locking features 313, the biasing members 308a and 308b drive the latch members 306 inward toward one another, and drive the locking features 313 into the recesses 219 (FIG. 2). With the locking features 313 positioned within the recesses 219 to retain the tongues 214, the buckle assembly 110 is fully latched. In the latched condition, the spring 312 biases the tongues 214 toward the opening 222, driving the engagement features 218 against the corresponding locking features 313. The locking features 313, however, lock the tongues 214 in the buckle assembly 110, and prevent further movement of the tongues 214 toward the opening 222.

Insertion of the tongues 214 into the opening 222 also includes actuation of the switch assembly 316. In particular, prior to insertion of the tongues 214, the magnets 314 are in a first position, spaced apart from the switch assembly 316 (FIG. 7A). As the tongues 214 are inserted into the opening 222, end portions of the tongues 214 contact the holding portions 404 on the ejector arms 402. As the tongues 214 are inserted further into the buckle 110, the tongues 214 overcome the biasing tension in the coils 410 and push the corresponding ejector arms 402 and the associated magnets 314 rearwardly toward the switch assembly 316. When the tongues 214 are fully inserted and the buckle assembly 110 is latched, the tongues 214 hold the magnets 314 in a second position adjacent to the switch assembly 316 (e.g., above the switch assembly 316, as shown in FIG. 7B). In the second position, magnetic fields from the magnets 314 interact with the switch assembly 316 to activate one or more switches therein, as described in more detail below.

To unlatch the buckle assembly 110, a user depresses the release actuator 224 to drive the latch members 306 outwardly. Specifically, a user can exert a force on the button 224 to compress the third biasing member 308c and drive the button 224 against the latch members 306. A lower portion of the button 224 contacts the angled surfaces of the release features 309 (FIG. 3C) to drive the latch members 306 outwardly, moving the locking features 313 out of the recesses 219. With the locking features 313 no longer blocking the engagement features 218, the tensional biasing force in the ejector arms 402 drives the tongues 214 outwardly out of the opening 222 to unlatch the buckle assembly 110. As the ejector arms 402 move toward the opening 222, the magnets 314 move away from the switch assembly 316, thereby deactivating the switches therein. In several embodiments, magnetic fields generated by the magnets 314 can be shunted via the frame 302. For example, when the magnets 314 are positioned away from the switch assembly 316, the associated magnetic fields can be directed into the frame 302, preventing any significant portion of the magnetic field from reaching the switch assembly 316 and activating the switches therein.

Figure 8A:
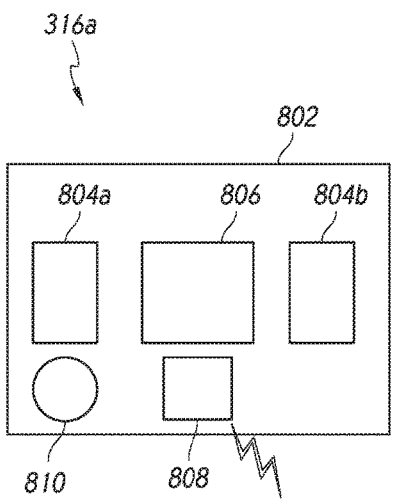
FIGS. 8A and 8B are schematic diagrams of switch assemblies configured in accordance with embodiments of the present technology.
Figure 8B:
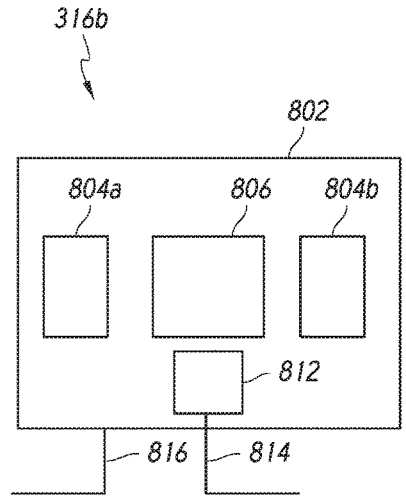

In several embodiments, the switch assembly 316 can include a variety of electronic components that can operate to provide an indication of the status of the buckle assembly 110 (e.g., latched or unlatched). FIGS. 8A and 8B are schematic diagrams of switch assemblies configured in accordance with embodiments of the present technology. In the illustrated embodiment of FIG. 8A, a switch assembly 316a includes a printed circuit board (PCB) 802 and a pair of switches 804 (identified individually as a first switch 804a and a second switch 804b) mounted thereon. The switch assembly 316a also includes a microcontroller 806, a wireless communication microchip 808, and a battery 810, each of which is also mounted to the PCB 802. The switches 804 can be A1171 integrated circuits (available from Allegro Microsystems, LLC of Worcester Mass.) and each can include an integrated Hall effect switch. The switches 804 can be positioned toward opposite ends of the PCB 802 to align with the corresponding magnets 314 within the buckle assembly 110. The movement of the magnets 314 discussed above with respect to FIGS. 7A and 7B can include movement of the magnets 314 to and away from positions proximate the switches 804. With the magnets 314 proximate the switches 804, magnetic fields from the magnets 314 can actuate the switches 804.

The battery 810 can provide power to the switch assembly 316, and the microcontroller 806 can be programmed to monitor the status of the switches 804 and communicate the status to vehicle systems via the wireless communication chip 808. For example, in some embodiments an external electronic device can be inserted into an on-board diagnostic (OBD) port on a vehicle. The external electronic device can operate with the vehicle's electronic system to activate or deactivate a seatbelt warning system in a known manner. In one example, the switch assembly 316a can determine that the buckle assembly 110 is unlatched, and communicate with the external electronic device to activate the associated vehicle's seatbelt warning system. In several embodiments, the switch assembly 316a can be at least partially sealed via, e.g., encapsulation to provide resistance to water, dirt or other contaminants. In such embodiments, the switch assembly 316a can include a sealed access portion to provide for replacement of the battery 810.

In the illustrated embodiment of FIG. 8B, a switch assembly 316b includes several components in common with the switch assembly 316 of FIG. 8A. For example, the switch assembly 316b of FIG. 8B includes the printed circuit board (PCB) 802 the pair of switches 804 and the microcontroller 806. However, rather than including the communication microchip 808, the switch assembly 316b of FIG. 8B includes a wired communication chip 812. The wired communication chip 812 can be operably coupled to one or more external components via a wired communication line 814. For example, the wired communication line 814 can be connected to a component (e.g., an OBD module) that can connect to a vehicle's electrical system. The switch assembly 316b of FIG. 8B also includes a power supply line 816 that can provide power to the switch assembly 316b. The power supply line 816 can be connected to a vehicle's electrical system or another source of electrical power (e.g., a battery distant from the PCB 802). In addition to the electronic components shown in FIGS. 8A and 8B, the switch assemblies 316 can include a variety of additional electronic components (e.g., amplifiers, logic switching circuits, etc.).

The buckle assembly 110 can include one or more indicators that can interact with the switch assembly 316 to provide an indication of the condition of the buckle (e.g., latched or unlatched). For example, a signal, such as an audible or visual signal can be provided via, e.g., a buzzer or an indicating light that can be positioned on or within the buckle assembly 110 and operably connected to the switch assembly 316. The switch assembly 316 can be configured to operate the buzzer or indicating light to provide a warning when the buckle assembly 110 is unlatched. In several embodiments, the buckle assembly 110 can communicate via wired or wireless means with a sensor positioned in the base of the seat 101. The sensor can determine whether the seat 101 is unoccupied, and disable any notifications provided by or via the switch assembly 316.

Figure 9:
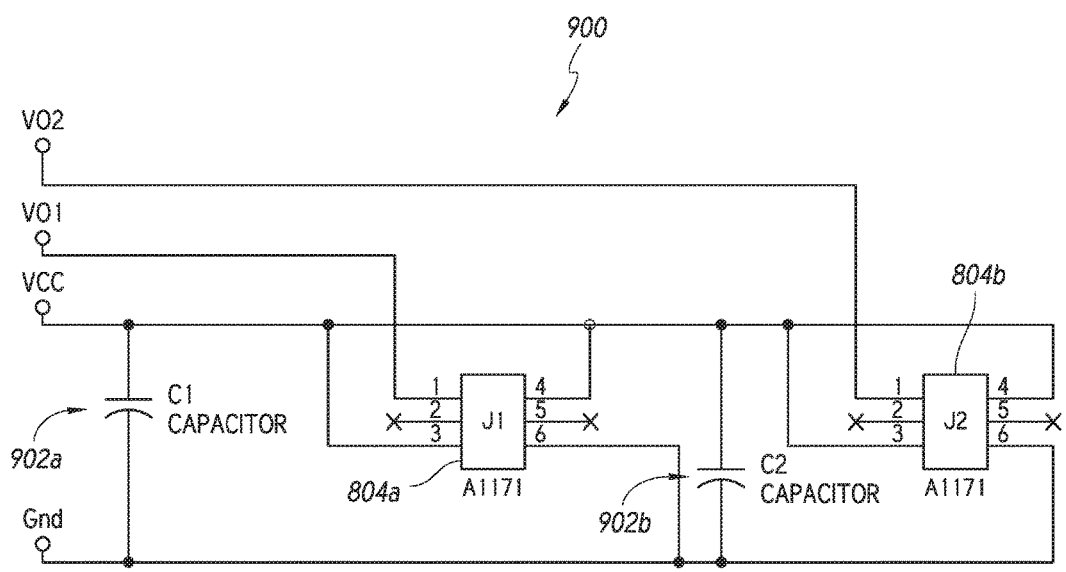
FIG. 9 is a schematic diagram of an electronic circuit configured in accordance with an embodiment of the present technology.

FIG. 9 is a schematic diagram of an electronic circuit 900 configured in accordance with an embodiment of the present technology. In the illustrated embodiment, the electronic circuit 900 includes the switches 804 and a pair of capacitors 902 (identified individually as a first capacitor 902a and a second capacitor 902b). The circuit 900 can be a portion of a larger circuit that is printed on the PCB 802, and can provide for connections between the switches 804 and a variety of electronic components within the switch assembly 316.

Various embodiments of the buckle assembly 110 can include several advantageous features. For example, in several embodiments, the spring 312, the magnets 314, and the switch assembly 316 can provide significantly enhanced performance characteristics, reliability, and durability for the buckle assembly 110. In many existing restraint systems, plastic switches and/or other movable plastic components are used to provide an indication of a buckle condition. With repeated use, the plastic components are susceptible to breakage that destroys the operation of the associated indicating system. Additionally, plastic switches and associated components in existing buckle assemblies are susceptible to contamination that can damage the components and/or hinder their proper operation. For example, many plastic switches cannot be easily and economically sealed to prevent damage from water or other contaminants. The buckle assemblies described herein, however, are much less susceptible to these issues. For example, latching and unlatching the buckle assembly 110 provides little to no wear on the metal spring 312. Specifically, the ejector arms 402 can be acted on by the tongues 214 repeatedly without causing any significant wear or damage. Additionally, the sealed switch assembly 316 can be substantially resistant to water and/or other contaminants. Moreover, the combined functionality of tongue ejection and buckle indication provided by the dual-purpose ejector and indicating mechanism 311 can reduce production costs via the limited number of required parts (when compared to existing components that are necessary to separately provide these functions).

From the foregoing, it will be appreciated that specific embodiments have been described herein for purposes of illustration, but that various modifications may be made without deviating from the spirit and scope of the present technology. Those skilled in the art will recognize that numerous modifications or alterations can be made to the components or systems disclosed herein. Moreover, certain aspects of the present technology described in the context of particular embodiments may be combined or eliminated in other embodiments. Further, while advantages associated with certain embodiments have been described in the context of those embodiments, other embodiments may also exhibit such advantages, and not all embodiments need necessarily exhibit such advantages to fall within the scope of the present technology. Accordingly, the inventions are not limited except as by the appended claims.

We claim:

1. A restraint system, comprising:
a first web connector having a first tongue;
a second web connector having a second tongue; and
a buckle assembly including—
a housing configured to receive the first and second tongues;
at least one biasing member positioned within the housing;
a first magnet carried by the at least one biasing member;
a second magnet carried by the at least one biasing member; and
at least one switch operably disposed within the housing, wherein insertion of the first and second tongues into the housing moves the first and second magnets from a first position to a second position relative to the at least one switch, and wherein the at least one switch is activated by the first and second magnets when the first and second magnets are in the second position.

2. The restraint system of claim 1 wherein the at least one biasing member exerts an ejecting force against the first and second tongues when the first and second tongues are inserted into the housing.

3. The restraint system of claim 1 wherein the at least one biasing member has a first end portion and a second end portion, and wherein the first end portion carries the first magnet and the second end portion carries the second magnet.

4. The restraint system of claim 1 wherein the at least one biasing member has a first end portion and a second end portion, wherein the first end portion carries the first magnet and the second end portion carries the second magnet, and wherein first tongue moves the first end portion toward the at least one switch and the second tongue moves the second end portion toward the at least one switch when the first and second tongues are inserted into the housing.

5. The restraint system of claim 1 wherein insertion of the first and second tongues into the housing applies a torsional force to the at least one biasing member.

6. The restraint system of claim 1 wherein the at least one switch includes a hall effect switch.

7. The restraint system of claim 1 wherein the second position is closer to the at least one switch than the first position.

8. The restraint system of claim 1 wherein the activated at least one switch provides a signal indicating engagement of the first and second tongues by the buckle assembly.

9. A restraint system, comprising:
a first web connector having a first tongue, wherein the first tongue includes a first engagement feature;
a second web connector having a second tongue, wherein the second tongue includes a second engagement feature, and
a buckle assembly including—
a housing configured to receive the first and second tongues;
at least one biasing member positioned within the housing;
a first magnet operably coupled to the at least one biasing member;
a second magnet operably coupled to the at least one biasing member;
at least one switch operably disposed within the housing, wherein insertion of the first and second tongues into the housing moves the first and second magnets from a first position to a second position relative to the at least one switch, and wherein the at least one switch is activated by the first and second magnets when the first and second magnets are in the second position,
a first locking feature and a second locking feature, wherein the first and second locking features are configured to releasably engage the first and second engagement features, respectively, when the first and second tongues are inserted into the housing; and
a release actuator, wherein actuation of the release actuator disengages the first and second locking features from the first and second engagement features, respectively, and enables the at least one biasing member to drive the first and second tongues out of the housing.

10. A restraint system, comprising:
a first web connector having a first tongue;

a second web connector having a second tongue; and
a buckle assembly including—
  a housing configured to receive the first and second tongues;
  at least one biasing member positioned within the housing,
  a first magnet operably coupled to the at least one biasing member;
  a second magnet operably coupled to the at least one biasing member; and
  a first switch and a second switch operably disposed within the housing, wherein insertion of the first and second tongues into the housing moves the first and second magnets from a first position to a second position relative to the first and second switches, and wherein the first magnet activates the first switch and the second magnet activates the second switch when the first and second magnets are in the second position.

11. A restraint system, comprising:
a first web connector having a first tongue;
a second web connector having a second tongue; and
a buckle assembly including—
  a housing having an opening shaped to receive the first and second tongues;
  a biasing member positioned within the housing, the biasing member having a first ejector arm and a second ejector arm;
  a first magnet carried by the first ejector arm;
  a second magnet carried by the second ejector arm; and
  a switch assembly operably disposed within the housing, wherein insertion of the tongues into the housing through the opening moves the first and second ejector arms to move the first and second magnets from a first position spaced apart from the switch assembly to a second position that activates the switch assembly to provide a signal indicating engagement of the first and second tongues by the buckle assembly.

12. The restraint system of claim 11 wherein the first and second ejector arms exert an ejecting force against the first and second tongues, respectively, when the first and second tongues are inserted into the housing.

13. The restraint system of claim 11 wherein the first and second magnets are individually carried in plastic, and wherein the plastic is heated and reformed to attach the first and second magnets to the first and second ejector arms, respectively.

14. A restraint system, comprising:
a first web connector having a first tongue;
a second web connector having a second tongue; and
a buckle assembly including—
  a housing having an opening shaped to receive the first and second tongues;
  a torsion spring positioned within the housing, the torsion spring having at least a first ejector arm, a second ejector arm, and a first biasing coil spaced apart from a second biasing coil, and wherein the second ejector arm projects from the second biasing coil;
  a first magnet operably coupled to the first ejector arm;
  a second magnet operably coupled to the second elector arm; and
  a switch assembly operably disposed within the housing, wherein insertion of the tongues into the housing through the opening moves the first and second magnets from a first position spaced apart from the switch assembly to a second position that activates the switch assembly to provide a Signal indicating encasement of the first and second tongues by the buckle assembly.

15. A restraint system, comprising:
a first web connector having a first tongue;
a second web connector having a second tongue; and
a buckle assembly including—
  a housing having an opening shaped to receive the first and second tongues;
  a biasing member formed from a wire and having a first ejector arm and a second ejector arm, wherein a distal end portion of the first ejector arm includes at least a first coil formed from a first portion of the wire, and wherein a distal end portion of the second ejector arm includes at least a second coil formed from a second portion of the wire;
  a first magnet held by the first coil;
  a second magnet held by the second coil; and
  a switch assembly operably disposed within the housing, wherein insertion of the tongues into the housing through the opening moves the first and second magnets from a first position spaced apart from the switch assembly to a second position that activates the switch assembly to provide a signal indicating engagement of the first and second tongues by the buckle assembly.

16. A method for operating a buckle assembly configured to releasably engage first and second web connector tongues, wherein the buckle assembly includes a first magnet, a second magnet, at least one biasing member carrying the first and second magnets, and at least one switch within a housing, the method comprising:
  moving the at least one biasing member to move the first magnet to a first position proximate the at least one switch in response to insertion of the first connector tongue into the housing;
  moving the at least one biasing member to move the second magnet to a second position proximate the at least one switch in response to insertion of the second connector tongue into the housing; and
  activating the at least one switch in response to movement of the first and second connector tongues to the first and second positions, respectively, wherein activation of the at least one switch causes the at least one switch to provide a signal indicating proper engagement of the first and second tongues by the buckle assembly.

17. The method of claim 16 wherein activating the at least one switch in response to movement of the first and second connector tongues includes activating at least one hall effect sensor in response to a magnetic field.

18. The method of claim 16 wherein activation of the at least one switch causes the at least one switch to provide a wireless signal indicating proper engagement of the first and second tongues by the buckle assembly.

19. The method of claim 16 wherein the buckle assembly further includes a release actuator, and wherein the method further comprises ejecting the first and second tongues from the housing via movement of the first and second magnets away from the first and second positions, respectively, in response to actuation of the release actuator.

* * * * *